United States Patent [19]

Crompton

[11] Patent Number: 4,784,902

[45] Date of Patent: Nov. 15, 1988

[54] COMPONENTS THAT CAN EXHIBIT LOW SMOKE, TOXIC FUME AND BURNING CHARACTERISTICS, AND THEIR MANUFACTURE

[76] Inventor: Geoffrey Crompton, 55 Arbour St., Southport, Merseyside, United Kingdom, PR8 6SQ

[21] Appl. No.: 907,880

[22] Filed: Sep. 16, 1986

[30] Foreign Application Priority Data

Sep. 19, 1985 [GB] United Kingdom ............... 8523190
Dec. 17, 1985 [GB] United Kingdom ............... 8531017
Jun. 20, 1986 [GB] United Kingdom ............... 8615045

[51] Int. Cl.$^4$ ............................................... B32B 5/16
[52] U.S. Cl. ................................. 428/283; 428/284; 428/285; 428/331; 428/920
[58] Field of Search ............... 428/284, 285, 286, 298, 428/300, 415, 417, 283, 331, 920, 921

[56] References Cited

U.S. PATENT DOCUMENTS

| | | | |
|---|---|---|---|
| 4,118,533 | 10/1978 | Hiphen et al. | 428/920 |
| 4,463,043 | 7/1984 | Reeves et al. | 428/285 |
| 4,469,543 | 9/1984 | Segal et al. | 428/285 |
| 4,522,876 | 6/1985 | Hers | 428/285 |
| 4,525,406 | 6/1985 | Pollock | 428/285 |
| 4,567,076 | 1/1986 | Therrun | 428/920 |
| 4,596,736 | 6/1986 | Eickhorn et al. | 428/298 |
| 4,608,300 | 8/1986 | Gruber | 428/285 |
| 4,673,614 | 6/1987 | Wells et al. | 428/285 |

*Primary Examiner*—James J. Bell
*Attorney, Agent, or Firm*—Wood, Herron & Evans

[57] ABSTRACT

A component such as a basic building panel comprises a first layer of phenolic resin impregnated glass fibre, a second layer of the same material and a block of foamed phenolic resin therebetween. The panel was formed in a mould shaped to form a flange around the panel, the flange being formed by adherence of the edges of the first and second layers to each other.

The panel is made by placing a layer of settable phenolic resin impregnated glass fibre mat in the mould, applying a foamable mixture of phenolic resin to said first layer and covering the foamable resin with a second layer of settable phenolic resin impregnated glass fibre mat before closing the mould. Foaming of the phenolic resin starts very quickly and when more or less completed, the mould is passed into an oven to set the phenolic resin in the outer layers.

13 Claims, 3 Drawing Sheets

COMPONENTS THAT CAN EXHIBIT LOW SMOKE, TOXIC FUME AND BURNING CHARACTERISTICS, AND THEIR MANUFACTURE

This invention concerns components that can exhibit low smoke, toxic fume and burning characteristics and their manufacture.

Items such as fire check doors, furniture, wall linings both internal and external, for domestic, industrial and other uses, aircraft, ship, boat, and automotive interiors and exteriors, automotive bulkheads and shields around or between fuel storage tanks and vulnerable parts or people, rockets and space station parts, internal and external fittings of caravans, trains, buses, lift interiors, underground tunnel linings, M.O.D. uses, such as tank interiors and ducting in general often need to have low smoke, toxic fume and burning characteristics. Indeed many other applications require the ability to protect life and property in the event of fire, or need to be in an environment which requires high heat resistance or good insulation value or both.

Many of these items and their components have in the past been made using asbestos based materials but now that asbestos has been proved to be a health hazard, cement based products which are heavy and brittle, have been used in some instances and metal products in others.

Furthermore, many building panels are composed of facing panels of enameled PVC, coated steel or aluminium with an insulating core of expanded polyurethane foam or glass fibre. The edges of such panels are usually open so that when, for example PVC and/or polyurethane are used there is a danger of toxic fumes and smoke being given off if the panels are subjected to fire.

Those panels which comprise metal facing sheets are on the other hand relatively heavy which can make handling difficult.

The object of this invention is to provide a component that may be lightweight, have good heat insulation properties and low fire, smoke and toxicity characteristics and methods and materials for making such components.

According to the invention there is provided a component formed from at least one layer of resin impregnated fibrous material.

The invention further provides a method of forming such a component comprising forming in a mould at least one layer of settable resin impregnated fibrous material and setting the resin.

For some applications laminates of two or more layers of resin impregnated fibrous material may be required possibly with one or more layers of other materials, such as glass fibre sheet, preferably impregnated with frits and a binding agent, and for other applications a layer of insulating material may be required between layers of the fibrous material. The insulating material may be a foamed or a fibrous material.

In one preferred embodiment the method of the invention comprises the steps of placing a first layer or layers of settable resin pre-impregnated fibre in a preheated mould, pouring a foamable synthetic resin mixture onto the layer or layers covering the foamable mixture with a second layer or layers of settable resin pre-impregnated fibre, closing the mould and, after a foaming period, heating the mould to set the resin.

In another preferred embodiment the method of the invention comprises the steps of placing a layer or layers of settable resin impregnated fibrous material in a mould and allowing the solvents to evaporate, applying pressure, such as via a matched mould or vacuum, to force the material into the mould shape, curing the front and back skins, for example by heating or chemically, and injecting a phenolic foam with ceramic filler between the two, or placing a premoulded slab of phenolic foam with ceramic filler or a slab of fibrous material between the two, to form a component ready for finishing.

To allow the foamable mixture to expand, the mating edges of the mould preferably have grooves or the like formed therein, say by scribing, whereby gases can escape as the foam expands. Heat is not essential in this part of the process and a foaming jig can be used to free the production mould for the next cycle.

As the foamable mixture expands it applies force to the facing layers that is useful in consolidating any voids therein. The final heating of the mould is preferably done gradually. For example, the mould may be passed through an elongate oven that has a rising temperature for start to finish. A suitable final temperature will probably be around 125 degrees C. over a period of around 90 minutes for the materials proposed later to be used in making panels and components.

The mould itself is sometimes shaped so that the edges of the two facing layers contact each other to provide a flange on one or more sides or completely round the component for joining purposes. Another design of mould would make allowances for the two shells to be joined edge to edge by virtue of adhesion properties of the resin used. Since the internal foam is the same material a bridge can be formed between the shells.

Alternatively the component materials can be mixed into the form of a sprayable slurry and applied by twin nozzle spray guns. This enables the sheet material to be thickened where necessary, such as on mating faces, before consolidation. Any complex detail can be formed in this way as an addition to the sheet which in some cases can pass behind the detail in the mould as a backing sheet. Some components can be made completely by spray techniques.

Some components can be made by injecting suitably proportioned continuously mixed resin and hardener into a closed mould containing ceramic fibre. The use of a heated tool can significantly reduce mould times. For example, a tool temperature of 70 degrees C. and a hardener at 8% can result in a two to three minute demould time.

The choice of materials in making the components of the invention may depend on the requirements of low fire, smoke and toxicity properties. One preferred fibre is a high purity alumina silica in bulk fibre form or compacted into a paper.

Another preferred fibrous material that may be used alone or mixed with other fibres is basalt. This may be produced as a paper-like material alone or mixed with other fibres.

The binder may be polypropylene, an acrylic resin or any other suitable resin. This preferred "paper" may be made by dissolving the binder and frits in a water bath and then adding the fibres and mixing. The mixture is then extruded onto a conveyor and formed into a sheet by conventional vacuum and rolling techniques.

A preferred "paper" form of fibrous material comprises basalt fibre, mullite fibre and glass fibre impregnated with a thermoplastic binder and optionally frits. A typical paper would have the following composition basalt fibres: 28% by weight,
mullite fibres: 28% by weight
glass fibres (chopped strand): 27% by weight,
frits: 7% by weight,
thermoplastic binder: 10% by weight.

The resin used to impregnate the layers of fibrous material is preferably a phenolic resin but urethane methacrylate resins may also be used as, indeed, may any other suitable resin that can convert the layers of fibrous material into malleable sheets. The resins may contain alumina trihydrate and/or frits.

The foamable material preferably has the same characteristics as and is preferably the same base resin as the outer skin impregnator, although other phenolics can be used. The foamable material may contain one or more of ceramics, basalt, frits and glass fibres. The preferred ceramic filler has the same general formula as the alumina silica. This filler increases the fire retardancy characteristics and also acts as a heat sink to prevent "puncking". The formula of the ceramic fibre is typically $Al_2O_3$—$SiO_2$ with traces of CaO or $SiO_2$. This material is available in different forms and is used for high heat insulation for kilns and ovens and other similar applications. A typical formula for the random weave substrate suitable for impregnation is $Al_2O_3$ 47%, $SiO_2$ 52.8%, $Na_2O$ 0.08% and $Se_2O_3$ 0.1%

An alternative to foamable material is basalt fibres in the form of a slab preferably impregnated with sodium silicate, especially if the component is to be load bearing. To form a bond between such a slab and the layers of resin impregnated fibrous material, an adhesive such as are based on sodium silicate may be used.

When using a slab of basalt fibre any gaps in the combination of a component therefrom may be filled with a suitable material, such as foamed phenolic resin.

For greater properties of heat or sound insulation, an additional layer or layers of ceramic fibre can be added behind the solid face of the component. A suitable material for this use could be manufactured from long, interlocking fibres, needled to provide a blanket with good handling strength. A light penetration of the phenolic resin may be achieved and the phenolic foam will also serve to stiffen the blanket which can be typically 5 to 10 mm in thickness. The aim is to produce a multilayer construction, the front face being moulded, decorative and hard wearing. Behind the front face in this instance is a ceramic blanket followed by phenolic foam with ceramic fibre filler. This central core is then followed by a ceramic blanket and a hard second face of the mouldings.

It may be advantageous to include in any resin used in the invention a substance to produce an intumescent effect, such as alumina trihydrate. This may actually raise the degradation temperature of the resin.

The construction so described may be suitable to act as a fire door or any other component used to halt the progress of fire. Under a flame of up to 1000 degrees C. the resin carbonises over a period of time leaving the fibre standing as a barrier until the car is struck with some force.

A cloth of twill weave construction can also be used with nichrome wire inserts or carbon fibre inserts. A current passed through a part-cured construction can complete the cure either as part of the build process or as an on site repair.

To provide a decorative finish and to protect against UV degradation the outer skins can be sprayed with a suitable paint, preferably a polyurethane in two component form. Another technique is to spray the inside of the mould with a suitable undercoat and transfer this coating onto the moulding during processing. Some P.V.C. paints can also be used to give better spread of flame protection. A milled fibre, typically with a 14 microns length, can be formulated into a paint using organic colouring media and a suitable resin binder. Rock dust can also be mixed with a resin and spray applied. A milled ceramic fibre can be mixed into a flame retarded polyester or epoxy gel suitably coloured, which can be applied over the normal release systems to give a coloured surface finish.

Another suitable protective paint for use on components of the invention may be of the type described in my co-pending Patent Application Nos. 8608075 and 8615006.

Alternatively a skin of a suitable thermoformable sheet, such as P.V.C. or flame retarded A.B.S. can be vacuum formed or applied in other ways to the front of the mould before the application of the ceramic/phenolic mat or spray.

A further alternative for providing a decorative finish or merely to protect against U.V. degradation may be to coat one of the outer skins of the panel, usually the first, with grit or chippings. The grit or chippings may be placed in the mould before the first skin of re-impregnated fibre so that under pressure and heat in the mould, the grit or chippings are adhered to the first skin by means of the settable resin.

In some instances the strength of the surface layers can be improved by the inclusion of glass or wire mesh reinforcing behind the ceramic phenolic impregnate. Another advantage is that the mesh can help to dissipate heat and so reduce flame travel. This is particularly useful for applications where fire prevention is important. The glass cloth can be impregnated with phenolic or epoxy resin. The former giving the greatest fire resistance, the latter the greatest strength. The wire mesh can be laid onto the back face of the skins and become encapsulated by resin. The wire mesh may also include the facility of on site curing by the passing of a current through the mesh. This would facilitate the protection of oil rig components, for example, by the appliction of part cured flexible mat which would be subsequently cured.

The substitution of glass or mat for the ceramic fibre as front or subsequent layers can increase the impact and tensile strength of components of the invention but decrease the fire retardant properties. The use of epoxy resin instead of phenolic gives a cheaper moulding, sometimes of better appearance, but decreases the fire retardant properties.

The panels of the invention may be further reinforced or clad with conventional metal sheets, such as of enamelled steel or aluminium. These metal sheets may be applied as a front face and so placed in the mould first to be adhered to the first skin during heating of the mould. Because the panels of the invention may have good rigidity, the metal sheets used may be of thinner gauge than used conventionally.

Roof panels can also be made using the same techniques and materials. These panels could be in many different shapes and sizes from flat panels for factory and office buildings to shaped panels for domestic roofing. When used in conjunction with silicone extrusions waterproofing can be guaranteed for 20 years.

In the domestic building situation the panels could be of handleable size, say 1 m by 2 m, the edges could overlap its neighbours on two sides and be overlapped on the other two. An upstand could take an extruded silicone seal on two sides which would be penetrated by downward facing flanges on the other two sides.

The exposed surface could be in any pattern capable of being moulded using these materials and methods. For example a discrete waveform would give aesthetic value. Another approach would be to reproduce the appearance of a conventional tiled roof.

The method of the invention is suitable for making building components that are not strictly panels. For example, glazing panels or cladding panels whether of this invention or of conventional form are often mounted on a metal, usually aluminium, framework thrown off from the wall to be clad. The aluminium framework is then provided with rubber or silicone extrusion that retain the panels by the application of further oversize extrusions into prepared slots. The aluminium framework, however, tends to form cold spots in an otherwise protected wall. The method of this invention may, therefore, be used to make channel section components that can be used to bridge the gap between the panels and which provide suitable insulation against the formation of cold spots.

BRIEF DESCRIPTION OF THE DRAWINGS

The invention will now be further described, by way of example only, with reference to the accompanying drawings, in which:

Referring to FIG. 1, a basic building panel 10 comprises a first layer of phenolic resin impregnated glass fibre mat 11, a second layer 12 of the same material and a block of foamed phenolic resin 13 therebetween. The panel was formed in a mould shaped to form a flange 14 around the panel 10, the flange being formed by adherence of the edges of the first and second layers to each other.

The panel 10 is made by placing a layer of settable phenolic resin impregnated glass fibre mat in the mould, applying a foamable mixture of phenolic resin to said first layer and covering the foamable resin with a second layer of settable phenolic resin impregnated glass fibre mat before closing the mould. Foaming of the phenolic resin starts very quickly and when more or less completed, the mould is passed into an oven to set the phenolic resin in the outer layers. The temperature of the oven may be gradually raised to about 125 degrees C. over a period of about 90 minutes. Alternatively the mould may be passed via a conveyor through a temperature graded oven over the same period of time.

Figure 1:
FIG. 1 is a section through a building panel.

Tests on one of two sheets of cured phenolic impregnated panel of FIG. 1 produced the following results which shows its excellent fire, smoke and toxicity properties: Flammability

| | | | |
|---|---|---|---|
| TO FAR 25,853 b | Nil | 1.0 second | 74 mm |
| TO FAR 25,853 a | Nil | 1.8 second | 89 mm |
| TO FAR 25,853 b-2 2 plies | | Zero burn rate | |
| TO FAR 25,855 a-1 2 plies | Nil | Nil | Nil |

Smoke evaluation—NBS Smoke chamber using live flame.

| Time of Test Minutes | Specific Optical Density | Proposed Limit |
|---|---|---|
| 0.5 | 0 | 50 |
| 1.0 | 1 | 50 |
| 1.5 | 1 | 50 |
| 2.0 | 1 | 50 |
| 3.0 | 1 | 50 |
| 4.0 | 2 | 50 |
| 5.0 | 3 | 50 |
| 20.0 | 10 | 50 | toxicant emission:
NBS Smoke chamber using live flame,
analysis of Draeger tube.

| Toxicant | Level after 20 minutes ppm | Proposed Limit ppm after 4 minutes |
|---|---|---|
| Carbon monoxide | 420 | 3500 |
| Ammonia | 1 | 100 |
| Hydrogen Cyanide | 8 | 150 |
| Formaldehyde | 3 | 500 |
| Hydrogen Chloride | 2 | 500 |
| Nitrogen Oxides | 4 | 100 |
| Hydrogen Fluoride | 0 | 50 |
| Sulphur Dioxide | 0 | 100 |

Figure 2:
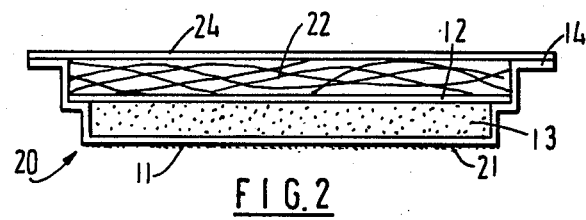
FIG. 2 is a section through a heat insulated building panel.

Turning to FIG. 2, an insulated panel 20 comprises the same basic structure as shown in FIG. 1 for which the same reference numerals are used for simplicity. In addition to the basic structure, the front face 11 of the panel has a coating 21 of grit and the rear face 12 has a layer 22 of non-burning polycrystalline mullite fibre thereon and a further layer 24 of phenolic resin impregnated fibre glass. The grit coating 21 is provided by spreading grit over the mould before the first layer of phenolic impregnated fibre glass is placed in the mould and the layer 22 is, of course, applied later. The grit adheres to the phenolic resin during the heating stage.

Figure 3:
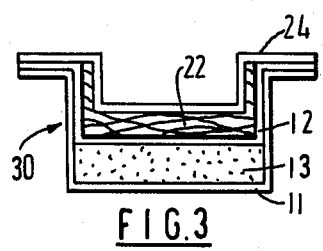
FIGS. 3, 4 and 5 are sections through different channel components.
Figure 4:
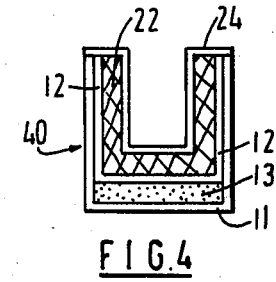
Figure 5:
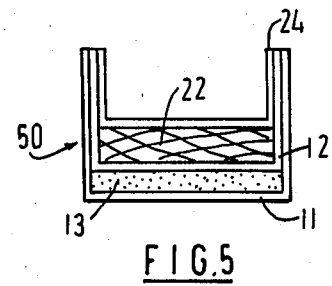

In FIGS. 3, 4 and 5 channel section components 30, 40 and 50 are shown respectively. The actual components are basically the same as in FIG. 2 and so have been given the same numbers for convenience. The basic differences are that the channel section of FIG. 3 is provided with a flange 32 whereas the others are not and the that the sections of FIGS. 3 and 4 have the insulation material of channel section whereas in FIG. 5 it is not.

Figure 6:
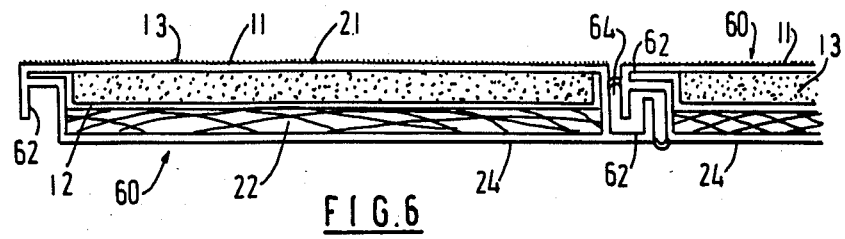
FIG. 6 is a section through a roof panel.
Figure 7:
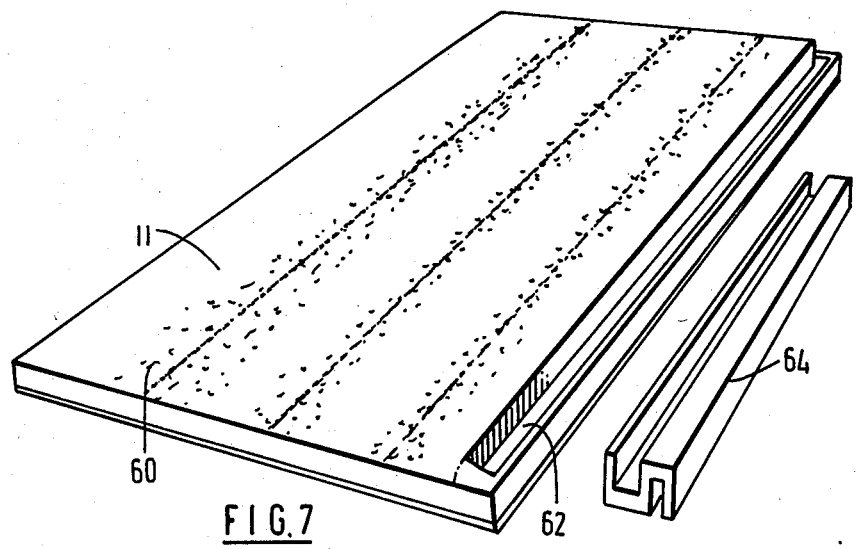
FIG. 7 shows the main components of the roof of FIG. 6.

FIGS. 6 and 7 concern roofing panels 60 which are substantially of the same form as the panels of FIG. 2 and so which are numbered accordingly. The main difference between the panels 60 and the panels 20 is in the edge formations. Whereas the panels 20 have merely flat flange edge formations, the panels 60 have a pair of shallow U-section channels 62 an opposing edge of the panel and being oppositely directed whereby the channels 62 can interfit with a suitably shaped rubber or silicone extrusion 64 therebetween to provide a continuous sealed structure.

Figure 8:
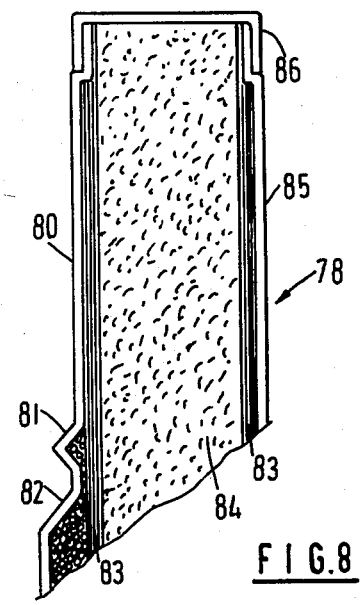
FIG. 8 is a section through a fire door.

Referring now to FIG. 8, a fire door 78 formed in a moulding operation has a moulded front face 80 of phenolic resin impregnated random ceramic fibre matrix having a pattern 81 formed therein during the moulding operation and a back face 85 which can be plain, embossed, textured or patterned in the same way as the front face 80. The hollow sections formed in the front face are reinforced with a sprayed mix 82 or even a trowelled slurry of phenolic foam with ceramic fibre filler.

A blanket of interlocked ceramic fibre 83 is applied on eachside of a phenolic foam insert 84 between the front and back faces. The edges of the door are capped with pre-moulded channel pieces 86 secured by the adhesive qualities of the phenolic resin.

Tests have shown that the resin will char and burn away over a period but the ceramic content stands for very much longer having a melting point of over 1760 degrees C.

This sequence of events means that when the resin has burned away, between 30 minutes and 90 minutes depending on the construction, the bulk of the ceramic, in particular 83 still stands to act as a fire and smoke barrier. Since the ceramic can be in the form of a non woven fabric it is possible to shoulder charge through the door provided this is considered a desirable feature during the manufacturing stage.

Figure 9:
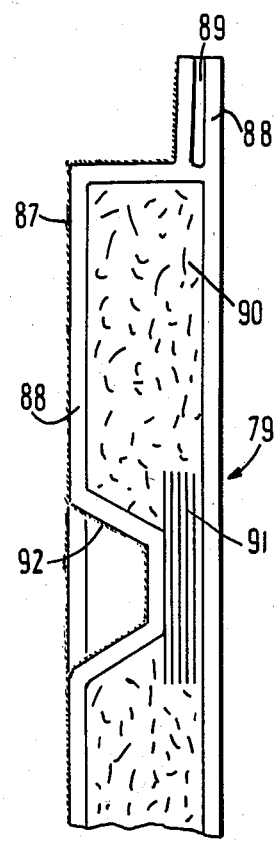
FIG. 9 is s section through a typical insulation panel.

Turning to FIG. 9 a moulded insulation panel 79 comprises a decorative front face 87 which has been thermoformed into the female mould tool before application of a preimpregnated, sprayed trowelled or injected facing skins 88 ceramic fibre impregnated phenolic resin. The facing material 87 must be carefully chosen to meet the desired fire and U.V. degradation specifications. The facing material 87 may be applied to the mould as a linwer by heat, vacuum, pressure or any other suitable means.

It is normal practice to protect other preimpregnated sheets with disposable covering materials. It is here proposed that the preimpregnated sheet should be covered with a protective material which is a formable decorative cover in its own right which remains in place during the application, and after, of say heat and vacuum to give a finished front face. A suitable material for this application is P.V.C. in foil or thicker form.

Between the facing skins 88 is a layer 90 of phenolic foam impregnated with ceramic fibre that can be injected between the skins 88 or molded separately and glued between them using the phenolic resin as an adhesive. The latter course would allow for inspection for voids and rectification procedures to be carried out on critical application. The edges pf the skins 88 are formed into flanges with reinforcing inserts 89 therebetween of metal or other non-burning material. Decorative features 92 can be formed during moulding and to avoid loss of protection due to thinning a mat of ceramic fibre 91 can be foamed in place between the decorative features and opposing skin 88.

Figure 10:
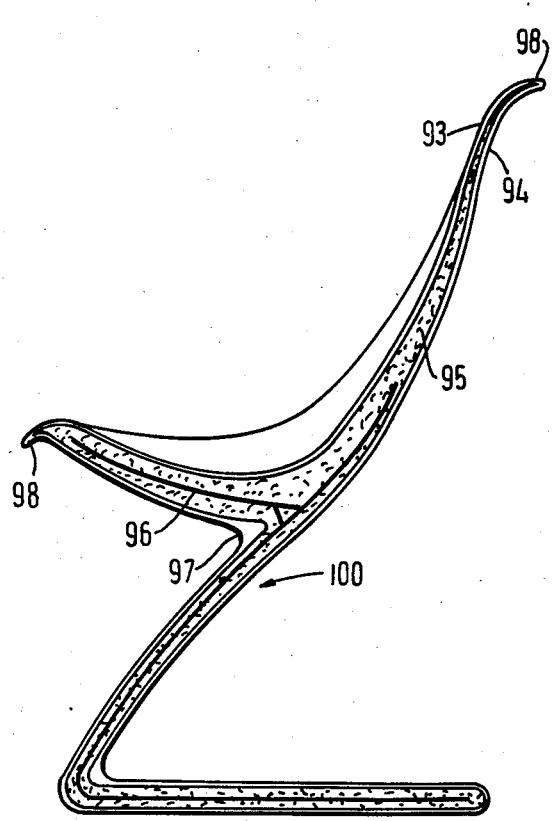
FIG. 10 is a section through a chair.

Finally, FIG. 10 shows a chair 100 formed by moulding ceramic fibre filled phenolic resin to foam face mouldings 93, 94, that can be finished with plastics or paint as previously described and by joining the mouldings by adhering the phenolic flanges 98 by phenolic adhesive cured either by chemicals or heat. The space between faces 93, 94 is filled with ceramic fibre filled phenolic foam 95 that encapsulates a metal matrix 90. Local strenghtening of the mouldings 97 can be effected by spraying, multilaminates or trowelling.

Whilst the illustrated embodiments have been described as incorporating phenolic resin impregnated mullite fibres and phenolic foams, it will, of course, be appreciated that they may be replaced by alternatives, such as involving the use of basalt fibres.

I claim:

1. A component comprising a composite of at least first and second layers of fibrous material impregnated with phenolic resin and an intervening layer of a foamed insulating material, wherein the fibrous material is further impregnated with frits and a binding agent.

2. A component according to claim 1, wherein the fibrous material is glass fibre sheet.

3. A component according to claim 1, wherein the foamed material comprises a phenolic resin.

4. A component according to claim 3, wherein the foamed material contains one or more materials selected from the group consisting of ceramics, basalt, frits and glass fibres.

5. A component according to claim 1, further comprising a layer of fibrous insulating material between layers of fibrous material impregnated with phenolic resin.

6. A component according to claim 5, wherein the fibrous insulating material comprises basalt.

7. A component according to claim 6, wherein the fibrous insulating material is impregnated with sodium silicate.

8. A component according to claim 1, wherein the impregnated fibrous material comprises alumina silicate.

9. A component according to claim 1, wherein the impregnated fibrous material comprises basalt.

10. A component according to claim 1, wherein the impregnated fibrous material comprises basalt fibres, mullite fibres, and glass fibres.

11. A component according to claim 1, wherein the binding agent is selected from the group consisting of polypropylene and acrylic resin.

12. A component according to claim 1, wherein the phenolic resin contains alumina trihydrate.

13. A component according to claim 1, having a decorative finish applied to or formed on one or more surfaces thereof.

* * * * *